(12) United States Patent
Marioni (10) Patent No.: US 6,335,579 B1
(45) Date of Patent: Jan. 1, 2002

(54) ELECTRIC MOTOR WITH PERMANENT-MAGNET ROTOR HAVING VISCOUS SHAFT COUPLING

(75) Inventor: Elio Marioni, Dueville (IT)

(73) Assignee: Askoll Holding S.R.L., Dueville (IT)

( * ) Notice: Subject to any disclaimer, the term of this patent is extended or adjusted under 35 U.S.C. 154(b) by 0 days.

(21) Appl. No.: 09/509,144

(22) PCT Filed: Jul. 23, 1998

(86) PCT No.: PCT/EP98/04624
§ 371 Date: Mar. 16, 2000
§ 102(e) Date: Mar. 16, 2000

(87) PCT Pub. No.: WO00/05799
PCT Pub. Date: Feb. 3, 2000

(51) Int. Cl.[7] .............................. H02K 49/00; H02K 5/10
(52) U.S. Cl. ............................... 310/87; 310/62; 310/63
(58) Field of Search ............................. 310/86, 87, 62, 310/68, 156.01; H02K 7/10, 49/00, 7/00

(56) References Cited

U.S. PATENT DOCUMENTS

| | | |
|---|---|---|
| 3,873,244 A | 3/1975 | Jaggi |
| 4,588,913 A | 5/1986 | Adami |
| 5,201,391 A | 4/1993 | Arai et al. |

FOREIGN PATENT DOCUMENTS

| | | |
|---|---|---|
| DE | A-25 09 663 | 9/1976 |
| DE | A-38 18 532 | 12/1989 |
| EP | A-0 474 004 | 3/1992 |
| JP | 55053167 A1 * | 7/1978 ............ H02K/7/10 |
| JP | 55053168 A1 * | 7/1978 ............ H02K/7/10 |

OTHER PUBLICATIONS

Patent Abstracts of Japan, vol. 4, No. 87 (E–016), Jun. 21, 1980 & JP 55 053167 A (Mitsubishi Electric Corp), Apr. 18, 1980 See abstract.
Patent Abstracts of Japan, vol. 4, No. 87 (E–016), Jun. 21, 1980 & JP 55 053168 A (Mitsubishi Electric Corp), Apr. 18, 1980 See abstract.
Patent Abstracts of Japan, vol. 10, No. 70 (M–462), Mar. 19, 1986 & JP 60 215126 A (Ebara Seisakusho KK), Oct. 28, 1985 See abstract.

* cited by examiner

*Primary Examiner*—Burton S. Mullins
*Assistant Examiner*—Karen Addison
(74) *Attorney, Agent, or Firm*—Guido Modiano; Albert Josif; Daniel O'Byrne (57) ABSTRACT

An electric motor with a permanent-magnet rotor having a viscous coupling to the shaft. In its electric part, the motor can be likened to a permanent-magnet synchronous motor, in which the rotor is mounted freely on the shaft and is contained in a hermetic casing which is rigidly coupled to the shaft and contains a liquid which fills the gap between the rotor and the container. The rotor therefore drives the casing only by virtue of the presence of the interposed liquid, so that the load is not rigidly connected to the shaft and the resulting operation of the motor can be likened to that of an asynchronous motor allowing mutually different rotation rates of the shaft and of the rotating field.

18 Claims, 7 Drawing Sheets

ELECTRIC MOTOR WITH PERMANENT-MAGNET ROTOR HAVING VISCOUS SHAFT COUPLING

TECHNICAL FIELD

The present invention relates to an electric motor with permanent-magnet rotor having viscous shaft coupling.

BACKGROUND ART

Conventional electric motors having a permanent-magnet rotor comprise a stator, with an electromagnet constituted by a lamination pack and by corresponding windings, and a rotor, which is arranged between two poles formed by the stator and is axially crossed by a shaft which is rotatably coupled to a supporting structure.

It is also well-known that the higher the inertia of the load applied to a synchronous motor, the more difficult it is to start the motor.

Starting in fact occurs as a transient process in which the rotation direction, the speed and the current change until the synchronous state is reached.

During this transient process, the rotor oscillates due to the alternating magnetic field produced by the stator, which by inducing a torque on the permanent-magnet rotor tends to move the rotor into a position in which the magnetic field of the rotor is aligned with the stator field.

If, during this oscillation, the rotor acquires enough kinetic energy to move imperceptibly away from the alignment position, it undergoes a further acceleration which makes it perform another portion of a turn and so forth until the synchronous state is reached.

For an equal power level, the lower the inertia of the applied load, the greater the extent of the oscillations produced on the rotor; accordingly, the rotor is able to accelerate, gaining a speed which allows it to synchronize with the alternating field of the stator.

Viceversa, if the inertia of the load is significant, the extent of the oscillation of the rotor is limited and does not allow to reach the synchronous state.

If the inertia of the load is even greater, the extreme case occurs in which once power has been supplied to the stator the rotor cannot even start the oscillation, i.e., it remains motionless in its equilibrium position.

For load inertias which are not too high with respect to the power level of the motor, couplings of the mechanical type are currently widely used which are inserted between the load and the rotor and allow the rotor, during startup, to oscillate freely through a certain rotation angle (usually 180 sexagesimal degrees).

In this manner, in the startup transient the rotor is disengaged from the inertia of the load and this is advantageous for attaining the synchronous state.

Accordingly, a free rotation occurs through a certain angle, followed by a sudden impact when the load is engaged.

At this point a direct connection between the load and the rotor is obtained; in practice, in operation the two are rigidly coupled.

The mechanical couplings are disclosed in EP 723329, where reference is also made to the application of the motor for a drain pump for a washing machine or dishwasher.

Usually, the inertia represented by the impeller of a pump for such an application is relatively low with respect to the power that can be supplied by the motor. Accordingly, these couplings fully achieve their function, which is indeed to reduce the torque required for startup, giving the correct power rating to the motor with respect to the load that it must drive, providing a consequent benefit to the overall efficiency of the machine and therefore to the cost.

However, there are applications in which the inertia of the load (for example the impeller of a fan) is so great that even the above-cited mechanical coupling is able to start it, unless the motor is oversized so much that it is excessively expensive to manufacture and use, making it accordingly uninteresting for the user.

For these applications, the solution is to provide a system which is able to transmit the torque of the motor gradually to the load during startup.

DISCLOSURE OF THE INVENTION

The aim of the present invention is to provide an electric motor with a permanent-magnet rotor in which gradual traction occurs at startup and in which the rotation rate of the load can be independent of the rotation rate of the rotor.

Within the scope of this aim, a consequent primary object of the present invention is to have a low static torque required to start the permanent-magnet synchronous motor.

Another important object of the present invention is to provide a motor which is constructively simple and compact.

Another important object of the present invention is to provide a motor which is quiet at startup and during operation.

Another object of the present invention is to provide a motor having reduced consumption and a low cost.

This aim, these objects and others which will become apparent hereinafter are achieved by an electric motor with permanent-magnet rotor comprising a stator, with an electromagnet constituted by a lamination pack and associated windings, and a rotor, which is arranged between two poles formed by the stator and is axially crossed by a shaft which is rotatably connected to a supporting structure, characterized in that said rotor is mounted freely on the rotation shaft to which the load is applied and is contained in a hermetic casing which is rigidly coupled to said shaft and contains a working fluid, said rotor and said outer casing being shaped so as to mutually interact only by means of the working fluid, thus allowing smooth variations between the speed of the rotor and the speed of the casing and accordingly between the rotor and the applied load.

Advantageously, the space between the outer surface of the rotor and the inner surface of the casing contains a viscous liquid, so that the rotor, by moving said liquid, turns the casing and therefore the shaft with the load applied thereto.

Conveniently, in a conceptually equivalent different embodiment a bladed impeller is rigidly coupled to at least one of the ends of the rotor and interacts with a corresponding bladed impeller which is rigidly coupled to said casing and is arranged frontally thereto, so as to provide a viscous actuation coupling between the rotor and the casing.

BRIEF DESCRIPTION OF THE DRAWINGS

Further characteristics and advantages of the electric motor according to the present invention will become apparent from the following detailed description of some embodiments thereof, illustrated only by way of non-limitative example in the accompanying drawings, wherein.

WAYS OF CARRYING OUT THE INVENTION

Figure 1:
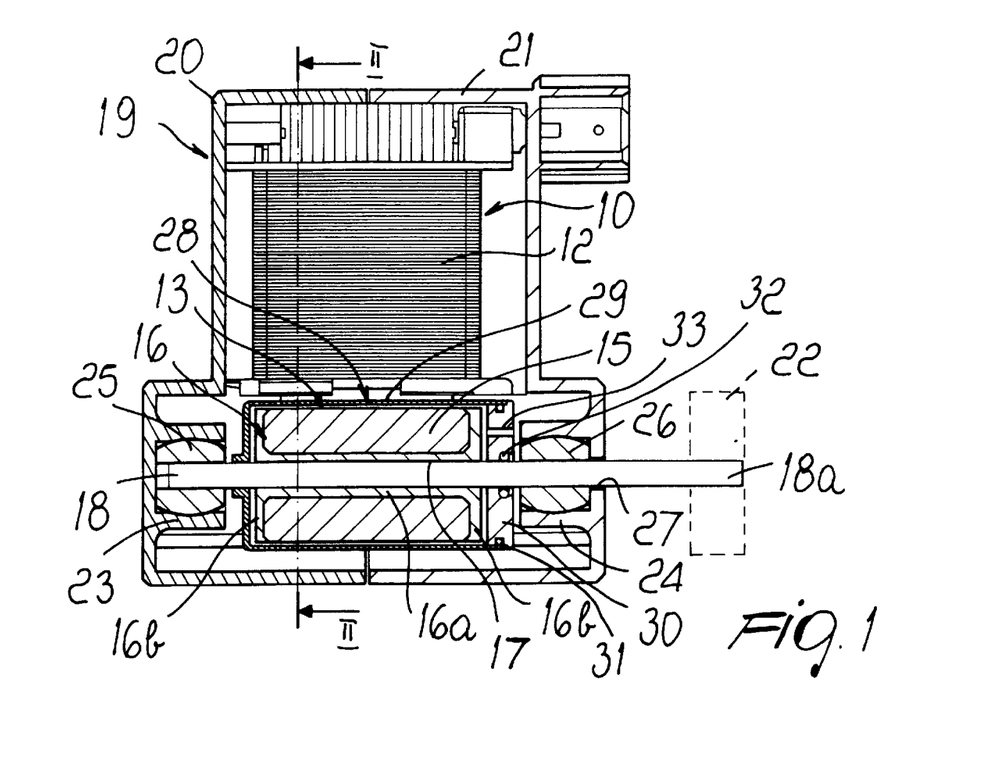
FIG. 1 is a longitudinal sectional view of a motor according to the invention in a first embodiment.
Figure 2:
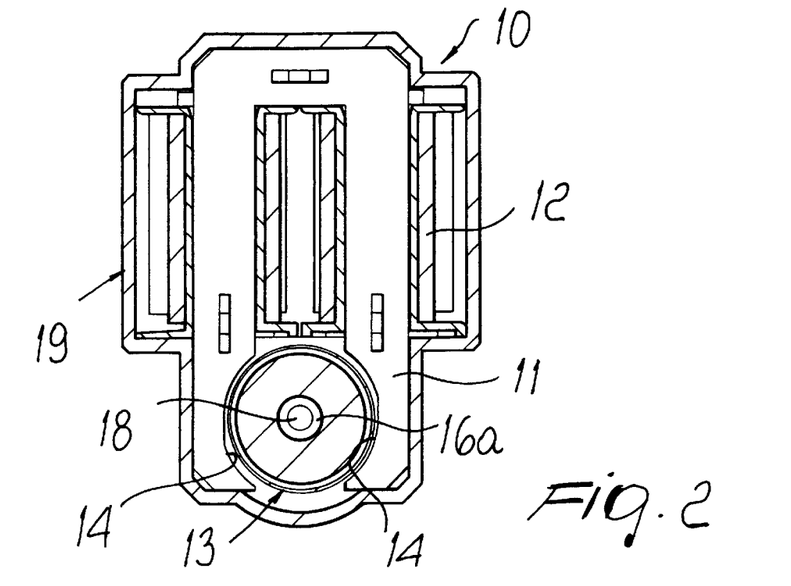
FIG. 2 is a sectional view, taken along the plane II—II of FIG. 1.
Figure 3:
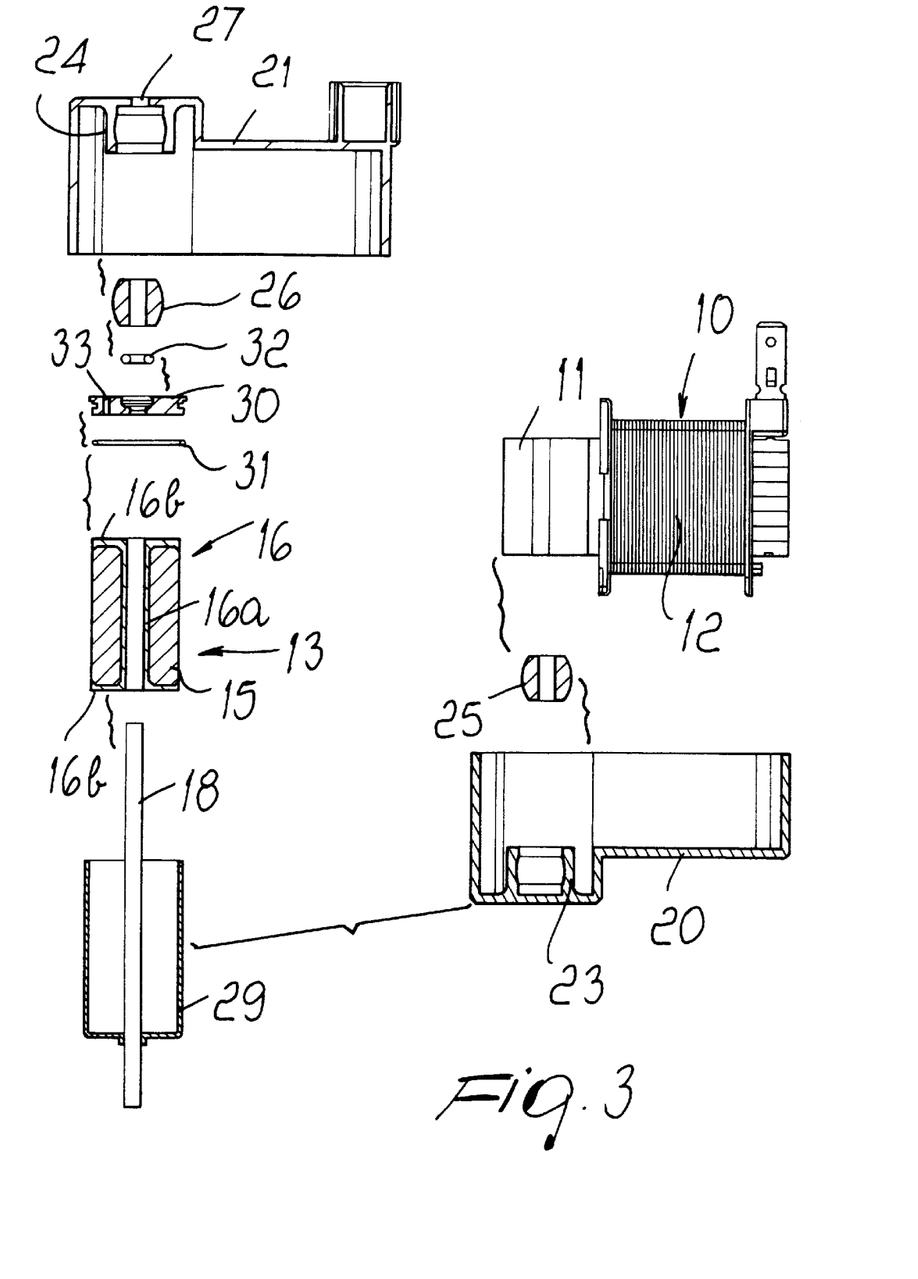
FIG. 3 is an exploded view of the components of the motor of FIG. 1.

With reference to the above FIGS. 1 to 3, in a first embodiment a synchronous permanent-magnet motor comprises a stator 10, constituted by a lamination pack 11 and by windings 12, and a rotor 13, which is arranged between two poles 14 formed by the lamination pack 11 of the stator 10.

The rotor 13, in particular, is constituted by a cylindrical annular permanent magnet 15 on which a plastic element 16 is overmolded, forming an inner shank 16a and end flanges 16b.

The rotor 13 therefore has, as a whole, a cylindrical shape with an axial hole 17 in which a shaft 18 is inserted; said rotor 13 can rotate freely about said shaft.

The shaft 18 is in turn connected to a supporting structure, conveniently generally designated by the reference numeral 19 and constituted in this case in practice by two complementary shells 20 and 21 which enclose the assembly constituted by the stator 10, the rotor 13 and the shaft 18, in any case allowing the shaft 18 to protrude with an end 18a to which a load to be turned, shown in dashed lines and designated by the reference numeral 22, is rigidly coupled.

Each one of the two shells 20 and 21 is internally provided, at the region of the shaft 18, with a corresponding tang, designated by the reference numerals 23 and 24 respectively, inside which a bush is provided, designated by the reference numerals 25 and 25 respectively, which rotatably supports a corresponding portion of the shaft 18.

As mentioned, one of the two shells, particularly the shell 21, has a through hole 27 which allows the end 18a of the shaft 18 to protrude.

According to the invention, the rotor 13 is arranged in a hermetic casing, generally designated by the reference numeral 28, which is rigidly coupled to the shaft 18 and contains a liquid.

In particular, the hermetic casing 28 comprises a cup-shaped element 29, which is rigidly coupled to the shaft 18, and a disk-shaped plug 30 which is engaged between the cup-shaped element 29 and the shaft 18, with which it forms a seal by means of respective O-rings 31 and 32 (rings which provide a static seal, since the regions on which they act do not move with respect to each other).

The plug 30 has at least one through hole 33 for introducing a preset amount of liquid inside the casing 28; said hole must conveniently be closed after introducing said liquid.

As an alternative, the seal between the plug 30 and the cup-shaped element 29 can be provided in other manners, such as heat-sealing, ultrasonic welding, etcetera.

The cup-shaped element 29 and the plug 30 substantially constitute a monolithic body and the assembly is rigidly coupled to the shaft 18.

The coupling to the shaft can occur equally in various manners, for example by interference (cup-shaped element 29 and/or plug 30), direct overmolding on the shaft 18 of the cup-shaped element 29 or of the plug 30, hot assembly, etcetera.

As to the liquid, it is conveniently a viscous fluid and motion is transmitted between the rotor 13 and the hermetic casing 28 by viscous drag produced by the internal stresses of the working fluid.

A motor with a viscous coupling between the rotor 13 and the corresponding load 22 has thus been provided which ensures the startup of said motor in conditions which are fully similar to those of an asynchronous motor.

The introduction of a smooth variation between the rotation rate of the rotor 13 (which is fixed in the synchronous motor) and the rotation rate of the load 22 (which is variable during the startup transient) allows to start the motor until it reaches the steady-state rotation rate.

Geometric conditions being equal, transmission efficiency is a function of the viscosity of the working fluid used.

According to the Reynolds-Petroff theory, there is an inverse proportionality relation between the gap between the rotor 13 and the internal wall of the casing 28, particularly in a radial direction but also in an axial direction, and accordingly said gap is conveniently given appropriate dimensions in order to achieve the highest efficiency.

This first embodiment of the invention is characterized by compact overall size, simple construction, quiet startup, silent operation, low consumption and low cost.

Moreover, the rotor 13 is in a casing 28 which is fully hermetic and is thus insensitive to external aggressive agents.

As regards quietness in operation, the fact that the rotor 13 is coupled to the load 22 in a viscous manner entails damping of the nonlinear torque oscillations that are typical of the motion of a synchronous motor.

This means less vibration and therefore quieter operation.

Figure 4:
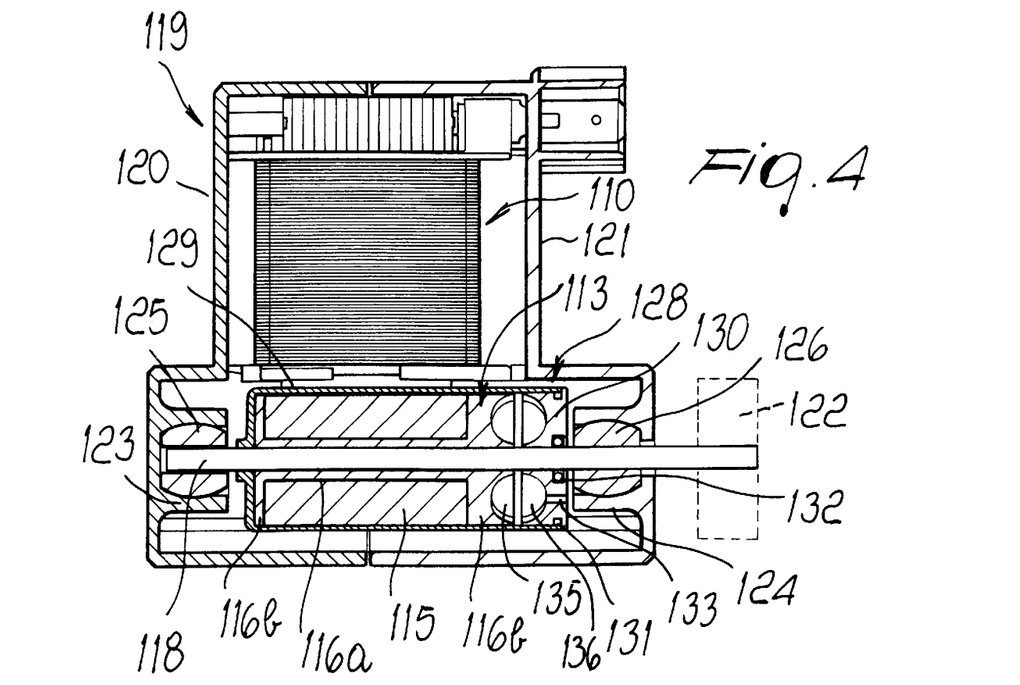
FIG. 4 is a longitudinal sectional view of a motor in a second embodiment thereof.

With reference now to FIG. 4, in a second embodiment there are again a stator 110, a rotor 113 and a shaft 118; said shaft is connected to a supporting structure 119 provided with two shells 120 and 121.

The shaft 118 is, in this case too, coupled at one end 118a to the load 122 and is rotatably connected, by means of bushes 125 and 126, to tangs 123 and 124 formed inside the shells 120 and 121.

The rotor 113 is again cylindrical and composed of a permanent magnet 115 and of a plastic element 116 which is overmolded to form an internal shank 116a and two end flanges 116b, but a bladed impeller 135 extends from the flange located towards the load 122 and acts as a pump for the liquid contained in the hermetic casing 128 in which the rotor 113 is arranged.

The impeller can of course extend from either of the two end flanges 116b as convenient.

The hermetic casing 128, in this case too, comprises a cup-shaped element 129 and a plug 130 which forms a seal by means of O-rings 131 and 132 and is provided with a closeable hole 133 for introducing the liquid.

According to the invention, a bladed impeller 136 extends from the part of the plug 130 that lies inside the cup-shaped element 129; said impeller is coaxial to the previous impeller 135 and faces it.

The impeller 136 constitutes a turbine which is rigidly coupled to the load 122 since it is integrated in the hermetic casing 128, which is in turn rigidly coupled to the shaft 118.

The casing 128, as in the preceding case, can be hot-fitted on the shaft or overmolded directly, or the cup-shaped element 129 and/or the plug 130 can be fitted on the shaft 118 with an interference fit. The shaft is indicated in this embodiment by the reference numeral 218.

In this case too, the seal between the cup-shaped element 129 and the plug 130 can be provided alternatively by heat-sealing, ultrasonic welding, etcetera.

Accordingly, a viscous coupling is formed in which the impeller 135 (pump), turned by the rotor 113, supplies kinetic energy to the working fluid contained in the casing 128.

The kinetic energy is converted into pressure energy (head) by the shape of the vanes of the meridian ducts of the impeller 135.

The working fluid moved by the vane ducts of the impeller 135 starts to circulate in the vane ducts of the impeller 136 (turbine), which accordingly starts to rotate.

Accordingly, drag occurs between the rotor 113 and the assembly constituted by the casing 128 and the shaft 118.

The load 122 is therefore turned.

The load turns in the same direction as the rotor 113.

A motor with a viscous coupling between the rotor 113 and the corresponding load 122 has thus been provided which ensures the startup of said motor in conditions which are fully similar to those of an asynchronous motor.

The introduction of a smooth variation between the rotation rate of the rotor 113 (which is fixed in the synchronous motor) and the rotation rate of the load 122 (which is variable during the startup transient) in fact allows to start the latter until it reaches the steady-state rotation rate.

With respect to the previous embodiment of the motor, this embodiment differs in that it has a higher efficiency.

It can be convenient to use, for the pump and the turbine, two different numbers of vanes which are prime to each other, in order to prevent the meridian ducts of the pump from simultaneously facing those of the turbine during operation.

The motor with viscous coupling is characterized, as mentioned, by high efficiency, compact size, simple construction, quiet operation particularly at startup, low consumption, low cost, and a rotor which is kept separated from any aggression of pollutants.

It should also be noted that the high efficiency of this viscous-coupling motor allows applications also for transmitting loads with low inertia when one wishes to decouple the load from the motor for any reason (for example to improve static torque, noise levels, etcetera).

Figure 5:
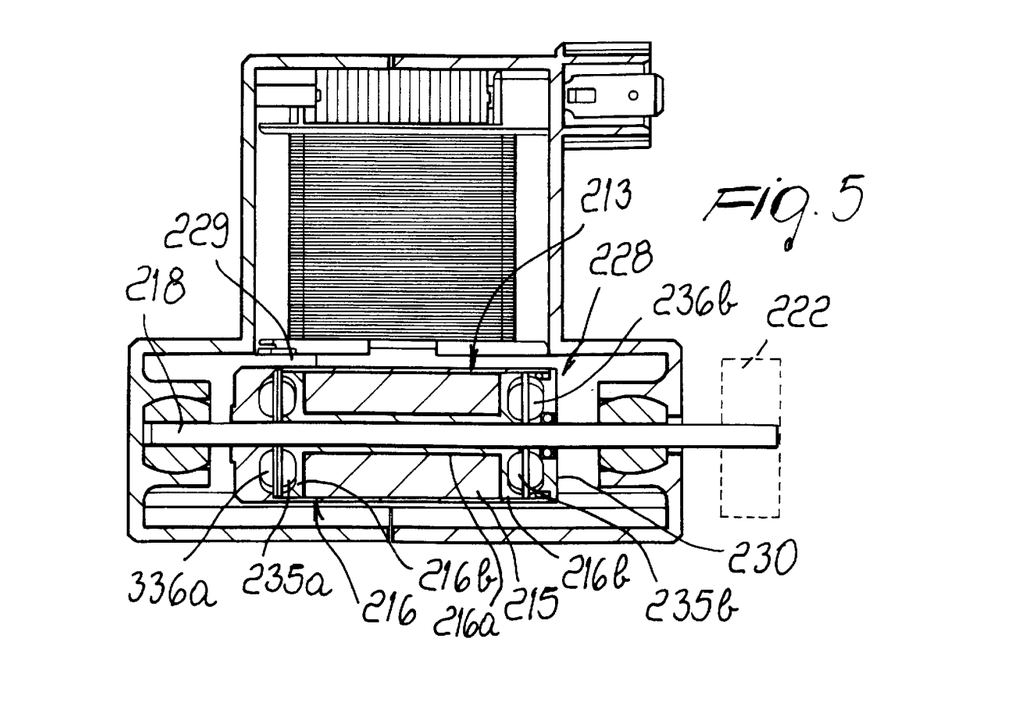
FIG. 5 is a longitudinal sectional view of a motor in a third embodiment thereof.

With particular reference now to FIG. 5, a third embodiment of the synchronous motor is similar to the preceding one and differs from it in that the rotor, now designated by the reference numeral 213, is again composed of a permanent magnet 215 and of an overmolded element 216 which forms an internal shank 216a and end flanges 216b but has two mutually opposite bladed impellers 235a and 235b which act as pumps and protrude from both end flanges 216b.

Likewise, the hermetic casing, now designated by the reference numeral 228, is again composed of a cup-shaped element 229 and of a sealing plug 230, but now it is internally provided with two bladed impellers which act as turbines and are designated by the reference numerals 236a and 236b respectively; one is located at the bottom of the cup-shaped element 129 and one is arranged at the plug 230, so as to form two viscous couplings with the impellers 235a and 235b.

This embodiment can also be provided when the torques to be transmitted are higher than in the preceding embodiment, maintaining the cylindrical structure of the casing 228.

Figure 6:
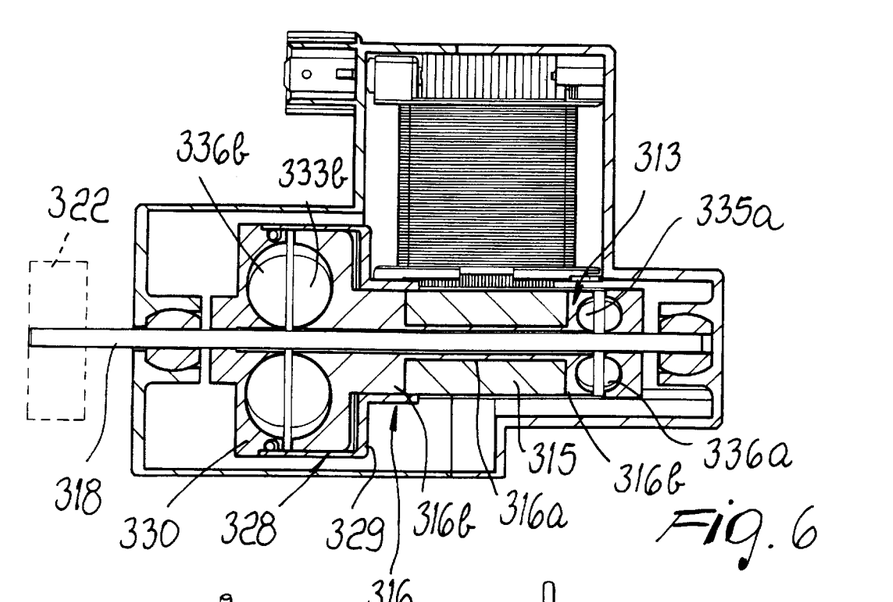
FIG. 6 is a longitudinal sectional view of a motor in a fourth embodiment thereof.
Figure 7:
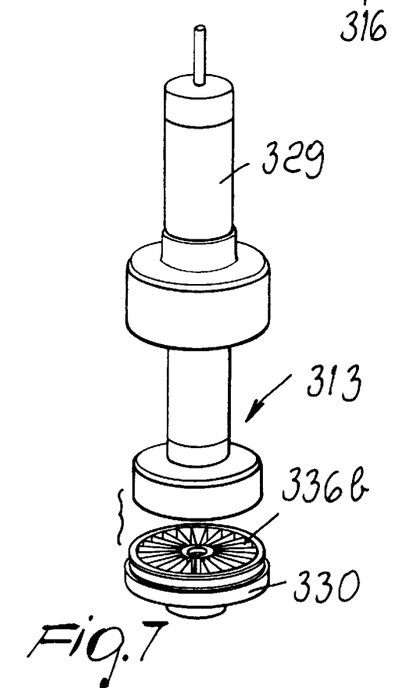
FIGS. 7 and 8 are exploded perspective views of the components of the motor of FIG. 6.
Figure 8:
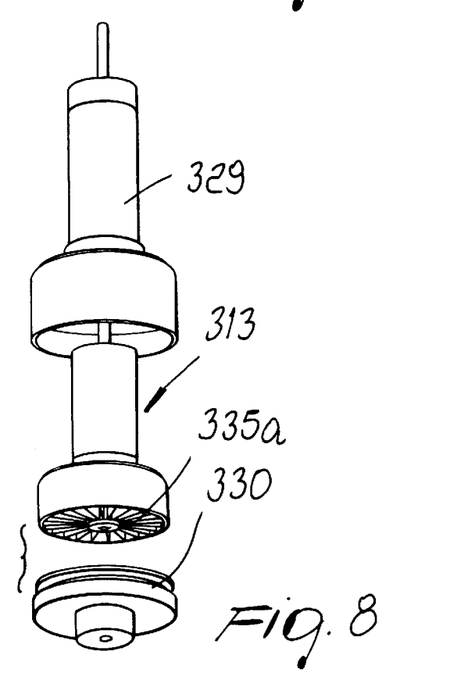
Figure 9:
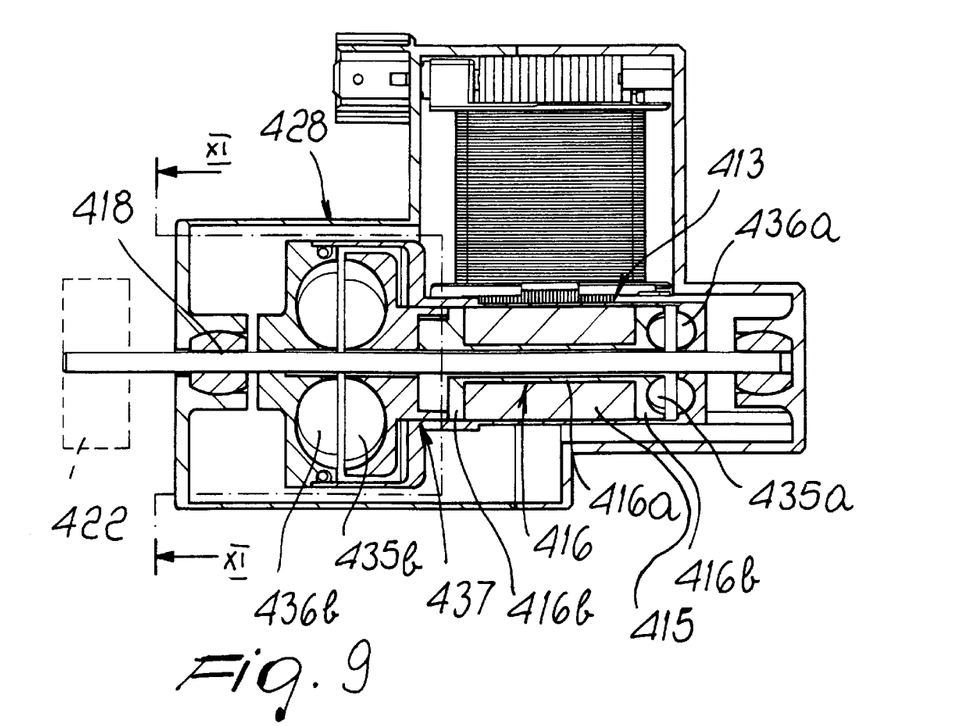
FIG. 9 is a longitudinal sectional view of a motor in a fifth embodiment.
Figure 10:
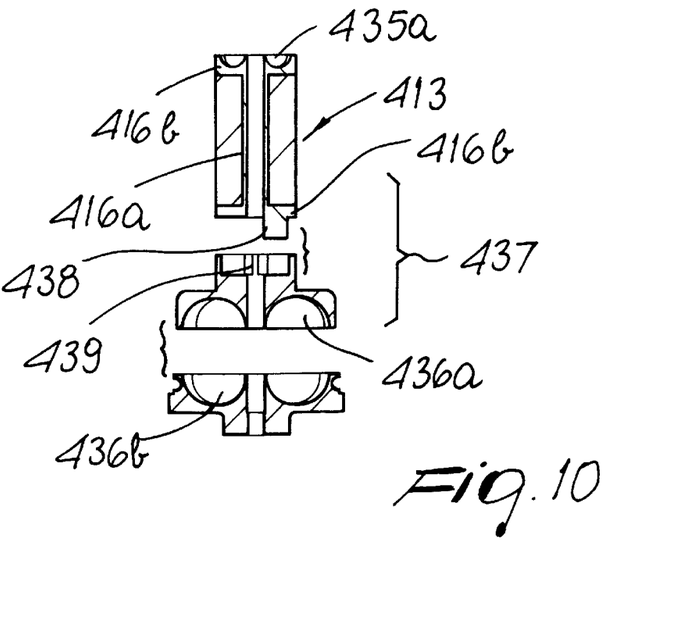
FIG. 10 is a sectional exploded view of some of the components of the motor of FIG. 9.
Figure 11:
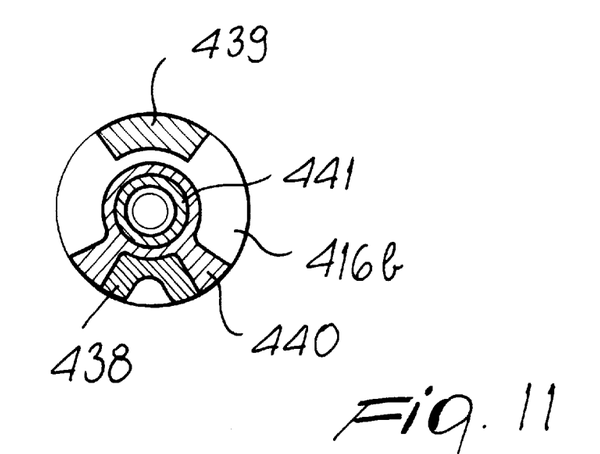
FIG. 11 is a sectional view, taken along the plane XI—XI of FIG. 9.
Figure 12:
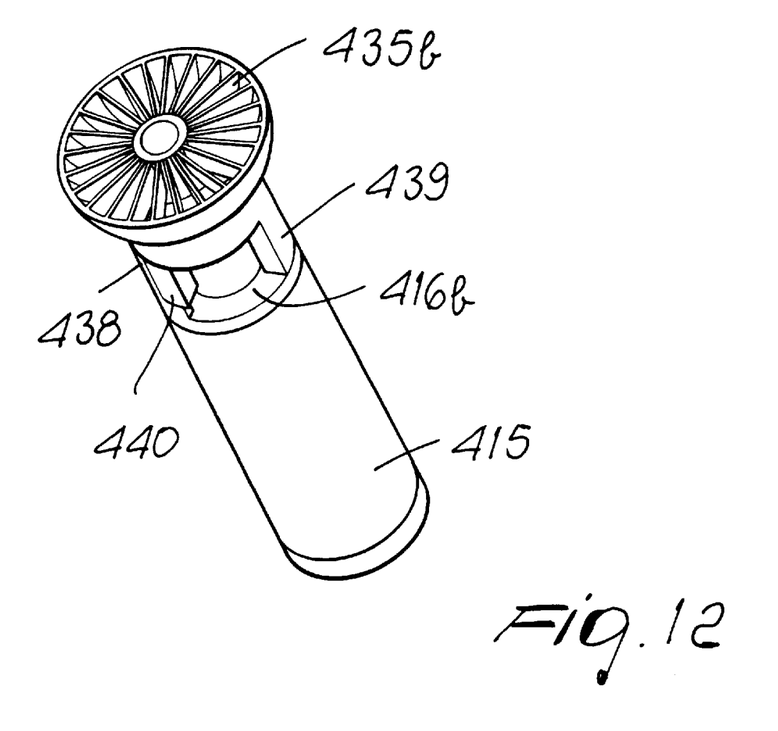
FIG. 12 is a perspective view of the rotor of FIG. 9.

With reference now to FIGS. 6 to 8, in a fourth embodiment the rotor, now designated by the reference numeral 313, is again composed of a permanent magnet 315 and of an overmolded plastic element 316, which in turn forms an internal shank 316a and end flanges 316b. In this case, however, the rotor 313 is not cylindrical; rather, the end flange 316b arranged towards the load 322 is shaped so that it expands into an end portion which has a larger diameter and in which a set of vanes 335b, similar to the preceding ones but larger, is formed. The shaft in this embodiment is indicated by the reference numeral 318.

In this case too, the expansion can be provided equally, as convenient, on either of the end flanges.

The other end flange 316a is identical to the preceding ones and thus has a set of vanes 335a formed within the cylindrical bulk of this part of the rotor 313.

Likewise, the hermetic casing 328, again composed of a cup-shaped element 329 and of a hermetic plug 330, has dimensions which are suitable to follow the shape of the rotor 313 and therefore has an expanded region in the portion where the cup-shaped element 329 and the plug 330 meet.

The plug 330 has a set of vanes 336b which is suitable for the set of vanes 335b of the rotor 313, while at the opposite end the bottom of the cup-shaped element 329 has a set of vanes 336a which is suitable for the set of vanes of the corresponding head of the rotor 313.

This configuration is suitable to drive particularly high loads 322; accordingly, a size increase is provided for one of the viscous couplings, particularly the coupling that technically allows such enlargement, i.e., the coupling of the end of the casing 328 through which the rotor 313 is inserted.

With reference now to FIGS. 9 to 12, in a fifth embodiment the configuration of the rotor, now designated by the reference numeral 413, and of the casing, now designated by the reference numeral 428, is similar to the fourth embodiment, except that the bladed impeller 435b which lies, in the case of the drawings, towards the load 422 is no longer rigidly coupled to the rotor 413 but is coupled thereto by means of a toothed traction coupling generally designated by the reference numeral 437. The shaft in this embodiment is indicated by the reference numeral 418.

The traction coupling comprises an axial eccentric tooth 438 which protrudes from the end flange 416b of the element 416 that is overmolded on the permanent magnet 415 and a similar axial eccentric tooth 439 which protrudes from the corresponding facing region of the impeller 435b.

Accordingly, for a certain extent of a complete turn (advantageously 180 sexagesimal degrees), the rotor 413 is uncoupled from the load constituted by the bladed impeller 435b, which can start freely before turning said impeller.

The advantage is that static torque is reduced, motor startup is facilitated also with considerable loads and efficiency is thus improved.

As in the fourth embodiment, the casing 428 is provided with a bladed impeller 436b which faces the impeller 435b and, on the opposite side of the rotor, with an impeller 435a and a corresponding impeller 436a on the bottom of the casing 428.

In this case a shock-absorbing elastomeric element 440 (fitted on a protruding tang 441 formed on the end flange 416b) is also provided which is arranged between the teeth 438 and 439 indeed to cushion their mutual impacts at startup.

Figure 13:
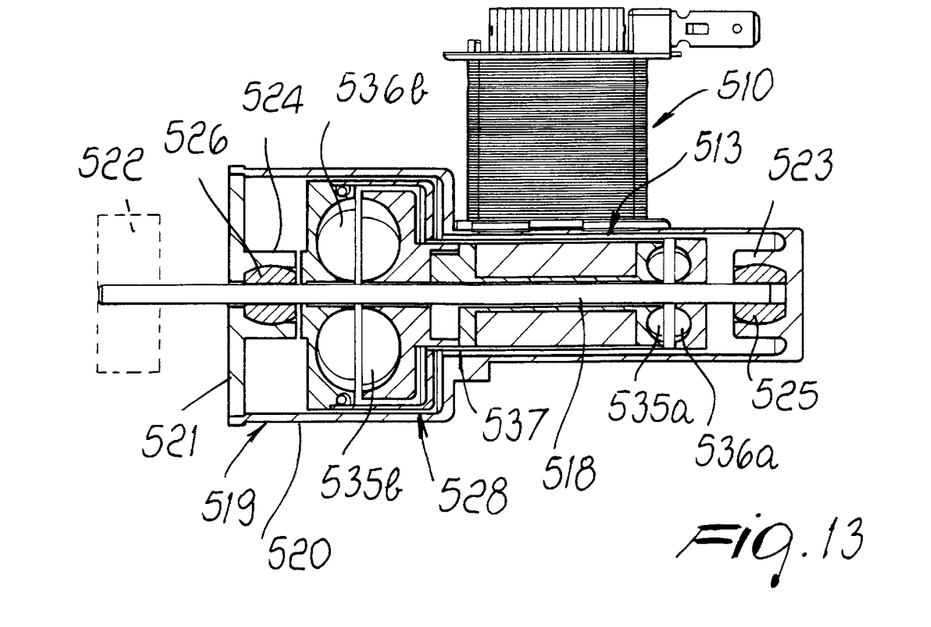
FIG. 13 is a longitudinal sectional view of a motor in a sixth embodiment.
Figure 14:
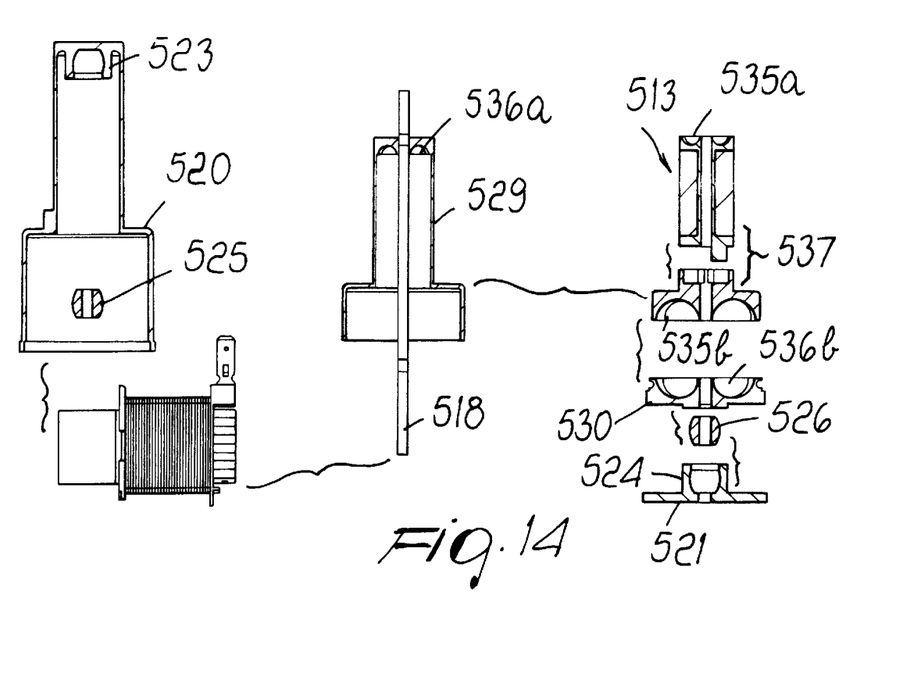
FIG. 14 is a sectional exploded view of the components of the motor of FIG. 13.

With reference now to FIGS. 13 and 14, a sixth embodiment has a rotor, now designated by the reference numeral 513, and a casing, now designated by the reference numeral 528 (with a cup-shaped element 529 and a plug 530), which are identical to those of the preceding fifth embodiment and thus also have a toothed traction coupling which is now designated by the reference numeral 537.

The impellers 535a and 535b, as well as the impellers 536a and 536b, again have different dimensions as in the preceding impellers.

In this embodiment, the supporting structure of the shaft 518 is constituted by a container 519 which substantially matches the shape of the casing 528 that is contained therein and is accordingly constituted by a cup-shaped element 520 and by a closure plug 521.

On the bottom of the cup-shaped element 520 there is provided a tang 523 for a bush 525 that supports one end of the shaft 518, while on the plug 521 a tang 524 is provided for a bush 526 for supporting the part of the shaft that is adjacent to the end that supports the load 522.

In this case, the supporting structure of the shaft 518 allows to assemble the rotor part separately from the stator part and produces further insulation between the stator and the rotor, which may be necessary in some applications.

The invention thus conceived is susceptible of numerous modifications and variations, all of which are within the scope of the inventive concept.

All the details may also be replaced with other technically equivalent elements.

In practice, the materials employed, so long as they are compatible with the contingent use, as well as the dimensions, may be any according to requirements.

What is claimed is:

1. An electric motor with permanent-magnet rotor comprising a stator, with an electromagnet constituted by a lamination pack and associated windings, and a rotor, which is arranged between two poles formed by the stator and is axially crossed by a shaft which is rotatably connected to a supporting structure, wherein said rotor is mounted freely on the rotation shaft to which the load is applied and is contained in a hermetic casing which is rigidly coupled to said shaft and contains a working fluid, said rotor and said hermetic casing being shaped so as to mutually interact only by means of the working fluid, thus allowing smooth variations between the speed of the rotor and the speed of the casing and accordingly between the rotor and the applied load.

2. An electric motor with permanent-magnet rotor according to claim 1, wherein a gap is provided between the outer surface of said rotor and the inner surface of said casing in which said rotor is accommodated.

3. An electric motor with permanent-magnet rotor according to claim 1, wherein a bladed impeller is rigidly coupled to at least one of the ends of said rotor and interacts with a corresponding bladed impeller which is rigidly coupled to said casing and is arranged frontally thereto.

4. An electric motor with permanent-magnet rotor according to claim 1, wherein a bladed impeller is coupled, by means of a toothed traction coupling, to one of the ends of the rotor and interacts with a corresponding bladed impeller which is rigidly coupled to said casing and is arranged frontally thereto.

5. An electric motor with permanent-magnet rotor according to claim 1, wherein said rotor comprises a cylindrical annular permanent magnet on which a plastic element is overmolded, said plastic element forming an internal tang and end flanges, said rotor thus having, as a whole, the shape of a cylinder with an axial hole in which said shaft is inserted, said rotor being able to rotate freely on said shaft.

6. An electric motor with permanent-magnet rotor according to claim 1, wherein said hermetic casing comprises a cup-shaped element which is rigidly coupled to said shaft and a plug which is inserted between said cup-shaped element and said shaft, with which it forms a seal.

7. An electric motor with permanent-magnet rotor according to claim 6, wherein said casing has at least one closeable through hole for introducing a preset amount of the liquid inside it.

8. An electric motor with permanent-magnet rotor according to claim 6, wherein said seal between the plug and the cup-shaped element is provided by means of O-rings, heat-sealing, or ultrasonic welding.

9. An electric motor with permanent-magnet rotor according to claim 6, wherein the connection between said casing and said shaft occurs by interference fit, direct overmolding on the shaft of the cup-shaped element or of the plug, or hot assembly.

10. An electric motor with permanent-magnet rotor according to claim 3, wherein a set of vanes connected to said rotor and a set of vanes connected to said casing have two different numbers of vanes which are prime to each other.

11. An electric motor with permanent-magnet rotor according to claim 4, wherein said traction coupling comprises an axial eccentric tooth which protrudes from said end flange of the element that is overmolded on said permanent magnet and a similar axial eccentric tooth which protrudes from the corresponding facing region of said impeller, which is thus connected to said rotor.

12. An electric motor with permanent-magnet rotor according to claim 11, wherein a shock-absorbing elastomeric element is arranged between said teeth in order to cushion their mutual impacts at startup.

13. An electric motor with permanent-magnet rotor according to claim 6, wherein said rotor has two first mutually opposite bladed impellers which extend from both heads and said hermetic casing is internally provided with two second bladed impellers, one at the bottom of said cup-shaped element and one at said plug.

14. An electric motor with permanent-magnet rotor according to claim 13, wherein said rotor has, equally on either of its two ends, a set of vanes which is larger and, at the other end, a set of vanes formed within the cylindrical volume of that part of the rotor.

15. An electric motor with permanent-magnet rotor according to claim 14, wherein said hermetic casing has dimensions which are suitable to match the shape of said rotor and thus has an enlarged portion in the region where said cup-shaped element and said plug meet, said plug being provided with a set of vanes which is suitable for the set of vanes of said rotor; the bottom of the cup-shaped element having, at the opposite end, a set of vanes which is suitable for the set of vanes of the corresponding end flange of said rotor.

16. An electric motor with permanent-magnet rotor according to claim 1, wherein said supporting structure for said shaft is constituted by two complementary shells which enclose the assembly constituted by the stator, the rotor and the shaft, allowing said shaft to protrude with an end to which the load is connected.

17. An electric motor with permanent-magnet rotor according to claim 1, wherein said supporting structure comprises a container which substantially matches the configuration of the casing contained therein and is accordingly constituted by an additional cup-shaped element and by an additional closure plug through which said shaft passes.

18. An electric motor with permanent-magnet rotor according to claim 17, wherein each one of said two elements of said container is internally provided, at the region of said shaft, with a corresponding tang which is internally provided with a bush that rotatably supports a corresponding portion of said shaft.

* * * * *